Feb. 23, 1971 U. KRABBE 3,566,248
CONTROL MEANS FOR REGULATING THE OUTPUT
FREQUENCY OF A FREQUENCY CONVERTER
Filed Jan. 24, 1969 3 Sheets-Sheet 1

INVENTOR.
ULRIK KRABBE
BY
Jennings Bailey Jr

Feb. 23, 1971 U. KRABBE 3,566,248
CONTROL MEANS FOR REGULATING THE OUTPUT
FREQUENCY OF A FREQUENCY CONVERTER
Filed Jan. 24, 1969 3 Sheets-Sheet 3

INVENTOR.
ULRIK KRABBE
BY

United States Patent Office 3,566,248
Patented Feb. 23, 1971

3,566,248
CONTROL MEANS FOR REGULATING THE OUTPUT FREQUENCY OF A FREQUENCY CONVERTER
Ulrik Krabbe, Helsingo, Denmark, assignor to Allmänna Svenska Elektriska Aktiebolaget, Vasteras, Sweden
Filed Jan. 24, 1969, Ser. No. 793,806
Claims priority, application Sweden, Jan. 25, 1968, 978/68
Int. Cl. H02m 5/16
U.S. Cl. 321—66    4 Claims

ABSTRACT OF THE DISCLOSURE

A frequency converter for converting an alternating voltage of a higher frequency to an alternating voltage of a lower frequency, the converter including at least two groups of mutually commutating rectifiers, is controlled by a pilot voltage generator which generates a voltage having the desired amplitude and frequency of the output voltage of the converter. The pilot voltage is compared with a reference voltage derived from the input voltage of the converter. The comparison is used to give the desired control angle for the rectifiers in each group. The control means for each rectifier includes an integrating arrangement including a memory device constituted by a capacitor and switching means constituted by transistors controlled by the input voltage of the converter to connect the memory device alternately to the pilot voltage generator and to the control circuit for the rectifier at a rate corresponding to the period length of the input voltage divided by the pulse number of the commutating group.

BACKGROUND OF THE INVENTION

(1) Field of the invention

The present invention relates to a means controlling a frequency converter having controlled rectifiers, which converter is of the type where the voltage from a single- or multi-phase network is converted directly, without first being converted to direct current, to a single or multi-phase voltage, the frequency of which is lower than, or possibly equal to, the input voltage.

(2) The prior art

Such a frequency converter is built up of a group of rectifiers, the rectifiers within each group commutating mutually in relation to the votlage of the feeding network. With single phase feeding, each group usually has two or four rectifiers and has the pulse number two, whereas with three-phase feeding each group contains three rectifiers and has the pulse number 3.

Since each rectifier group can only deliver current in one direction at least two reverse-parallel-connected rectifier groups are required for single phase output voltage. With three-phase output voltage three rectifier groups may be arranged in polygon connection or two sets of three reverse-parallel-connected groups in star connection.

In order for a rectifier in a rectifier group to become conducting, it must have a positive commutation voltage. As the commutation voltage for each rectifier is positive during an internal of 180°, each rectifier can be ignited with a delay angle which can be varied from 0° to 180°.

The control is often carried out according to the so-called vertical control principle where each rectifier has a substantially sinusoidal reference voltage derived from the feeding network and a pilot voltage which is common for the entire group, which two voltages are compared so that ignition pulses are emitted to a rectifier when said two voltages are equal. Proportionality is thus achieved between the output voltage emitted from a rectifier group and the pilot voltage of the group. In a frequency converter the pilot voltage is an alternating voltage and the fundamental of the output voltage for the rectifier group will thus in frequency and curve shape correspond to the pilot voltage which will thus form a "model voltage" for the rectifier group. This in turn causes the rectifier group to operate during the positive half-periods of the pilot voltage as a rectifier whereas during the negative half-periods it operates as an inverter.

Thus, in two reverse-parallel-connected rectifier groups, one group will operate as an inverter while the other operates as a rectifier and vice versa, and this operation alternates within the two groups at the rate of the output voltage. The voltage generated by a rectifier group, apart from the desired output voltage, always contains certain harmonics which are dependent on the pulse number of the rectifier group and as the harmonics from the rectifying and the inverting groups are different both in size and phase position, a reactor must be connected between the two groups to limit possible harmonic currents. Such a reactor is dimensioned so that it gives only a reasonable voltage decrease for the fundamental frequency of the output voltage.

Apart from the harmonics mentioned, the output voltages of the rectifier groups will also contain certain subharmonics which are determined by the ratio between the input and output frequencies. These subharmonics have such low frequency that they cannot be filtered away by normal reactors, especially as, at certain simple relations between said two frequencies, they may have direct voltage components. Especially when the output frequency approaches the input frequency, the subharmonics become troublesome so that vertical control is usually only suitable for output frequencies up to one third of the input frequency at a pulse number of three and even lower at a pulse number of two.

SUMMARY OF THE INVENTION

The present invention relates to the control of frequency converters according to the vertical control principle where the output frequency is freely variable up to the input frequency without the occurrence of subharmonics or DC components and is based on the following reqirements for the control.

During each conducting interval for a rectifier in a rectifier group, the delay angle of the rectifier must be determined so that the average voltage from the rectifier group during this interval is proportional to the average value of the pilot voltage during the same interval. If it is then ensured that the pilot voltage contains no DC components or undesired harmonics or subharmonics, and also that for a multi-phase pilot voltage the sum of the phase voltages is always zero, the output voltages of the rectifier groups will not contain other harmonics than those stemming from the fundamental of the feeding network and the pulse number of the converter.

However, the problem is that the average value of the pilot voltage during an interval is not known until this interval is completed. This problem is solved according to the invention by integrating during $1/n$ of a period of the input voltage, where $n$ is the pulse number of the rectifier group, the pilot voltage and storing this integration value to control the rectifier in question during the next $1/n$ period of the input voltage. A control means according to the invention thus built up will cause the fundamental of the input voltage to in complete agreement with the pilot voltage, while being displaced $1/n$ period of the input voltage in relation to the pilot voltage. However, this is of no consequence since for each case the phase position of the pilot voltage can be selected in relation to the desired phase position of the output voltage.

BRIEF DESCRIPTION OF THE DRAWINGS

The invention will otherwise be described with reference to the accompanying drawings where FIGS. 1 and 2 show the previously known vertical control principle for a static converter whereas FIGS. 5 and 6 show two known embodiments of multi-phase frequency converters whereas

DESCRIPTION OF THE PREFERRED EMBODIMENTS

Figure 1:
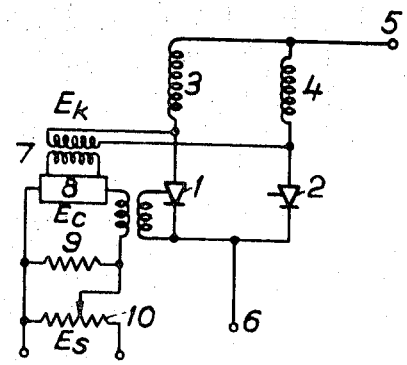
Figure 2:
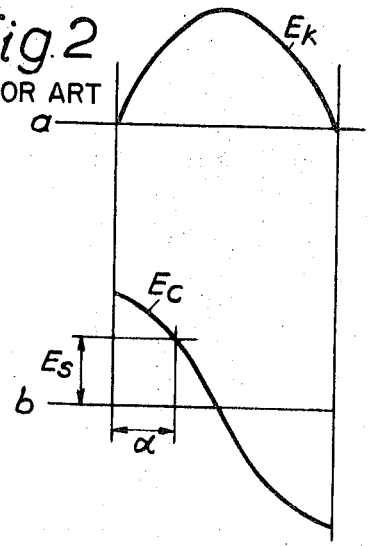

FIG. 1 shows purely schematically a static converter or a part of one comprising two rectifiers 1 and 2 with their transformer windings 3 and 4. Only the rectifier side of the transformer has been shown, the network side being omitted. The two rectifiers are shown as simple thyristor rectifiers, but often each one consists of a number of series and parallel connected thyristors corresponding to the desired rated voltage and rated current of the static converter. If, for example, the rectifier 1 is current-carrying, the current can commutate over to the rectifier 2 if the anode of this rectifier is positive in relation to the anode of the rectifier 1, in other words, if the voltage in the winding 4 exceeds the voltage in the winding 3. The difference between these voltages is the commutation voltage $E_K$ which is usually depicted as a sine voltage as shown in FIG. 2a, and which can be taken out through a voltage transformer 7 in FIG. 1. If the voltage $E_K$ is imagined as a sine voltage, this can be converted by the phase shifting device 8 to the cosine voltage $E_C$ shown in FIG. 2b which, together with a controlling direct voltage $E_S$ from a potentiometer 10 through a resistor 9, can be used to determine a control angle $\alpha$ for a rectifier. This is done, for example, by feeding both these voltages to the primary side of an impulse transformer so that on the secondary side of this an impulse is obtained when the voltage $E_C$ exceeds the voltage $E_S$, which pulse can be used to ignite a rectifier by connecting it to the control electrode of the rectifier.

It is seen that by varying the voltage $E_S$ between positive and negative amplitude values of the voltage $E_C$, the control angle $\alpha$ can be varied from 0° to 180° and it can be shown that if the control is carried out according to this principle the direct voltage over the terminals 5, 6 in FIG. 1 will be proportional to the control voltage $E_S$.

If it is now assumed that the connection in FIG. 1 comprises a part of a frequency converter and that the control voltage $E_S$ according to FIG. 2b is replaced by an alternating voltage comprising a pilot voltage for the frequency converter, it is seen that the voltage over the terminals 5, 6 will in principle correspond to the pilot voltage both as regards frequency and curve shape.

Figure 3:
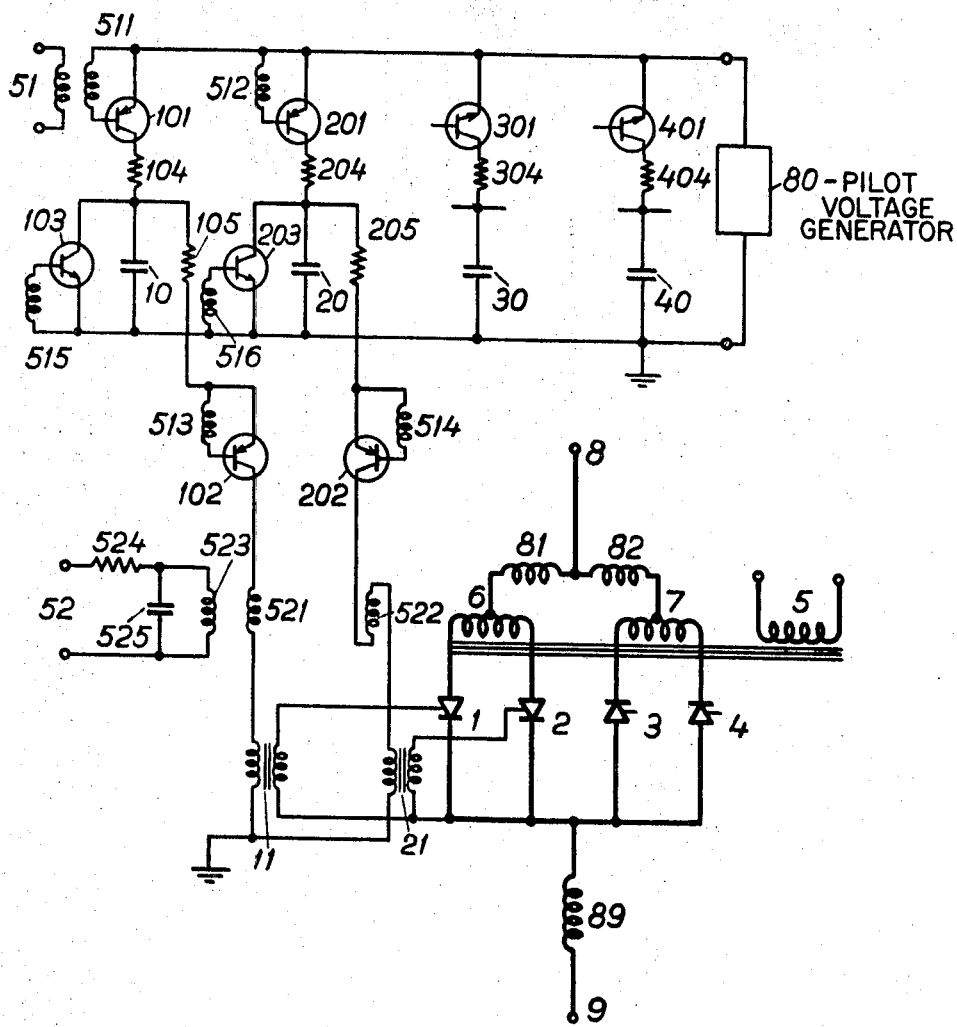
FIG. 3 shows a single phase frequency converter according to the invention.

This is only true more or less accurately, however, if the output frequency is very low in relation to the input frequency. With higher output frequency the output voltage will contain extremely strong harmonics and, with frequency relations between the output and input sides which are not very simple, the output voltage will also include strong subharmonics, which may give rise to DC excitation and eddy currents which make operating conditions in the converter more complicated or impossible. However, such subharmonics can be avoided if the previously mentioned conditions are fulfilled and this can be arranged by means of a control means according to the invention as shown in FIG. 3. This figure shows a frequency converter for converting an alternating voltage having a higher frequency to an alternating voltage having a lower frequency. The converter comprises two groups of mutually commutating rectifiers 1, 2 and 3, 4, respectively. Each rectifier group is provided with a corresponding secondary winding 6 and 7 respectively on a converter-transformer, the primary winding 5 of which is fed by a single phase alternating voltage, which thus provides the input voltage for the converter. The output voltage of the converter is taken out over the terminals 8, 9 after smoothing in a reactor 89.

Further, the rectifier groups are provided with individual reactors 81 and 82 in order to take up the harmonics of the input voltage due to the pulse number. Control circuits are shown for the rectifiers 1 and 2 comprising control voltage transformers 11 and 21, respectively, the secondary sides of which are connected to the control electrode of the corresponding rectifier. The primary sides of these control voltage transformers are fed by a reference alternating voltage derived from the input voltage of the converter in series with a control voltage derived from a pilot voltage generator 80.

The reference alternating voltage is taken from the terminals 52 which are connected to the same input voltage as the transformer winding 5. With the help of a phase-shifting device consisting of a resistor 524 and a capacitor 525, this voltage is shifted 90° and fed into the primary winding 523 of a transformer provided with two secondary windings 521 and 522 which are connected in series with the primary windings of each of the transformers 11 and 21, respectively.

The pilot voltage generator 80 delivers an alternating voltage, the frequency of which is equal to the desired output frequency of the converter and the curve shape of which corresponds to the desired curve shape of the output voltage of the converter. This pilot voltage generator is connected to integrating memory devices in the form of capacitors 10, 20, 30, 40 for each of the rectifiers 1–4 in the converter. For the capacitors 10 and 20 belonging to the rectifiers 1 and 2, the switching devices are shown in more detail as consisting of transistors 101 and 201 for connecting the capacitors to the pilot voltage generator, transistors 102 and 202 for connecting the capacitors to the control voltage transformers 11, 21 of the rectifiers and short circuiting members in the form of transistors 103, 203. Said transistors are controlled by the secondary windings 511–516 of a transformer, the primary winding 51 of which is connected to the input voltage of the frequency converter, that is, to the transformer winding 5. The shown transistors 101–103 and 201–203 can only conduct one half period of the pilot voltage from the generator 80. In order to take care of the other half period as well, these transistors must therefore be reverse-parallel-connected each to its own extra transistor and each such pair of reverse-parallel-connected transistors is controlled so that the capacitors 10 and 20 can be charged with positive or negative polarity corresponding to the positive or negative half periods, respectively, of the pilot voltage. For the sake of clarity, however, these extra transistors have been omitted in FIG. 3.

Figure 4:
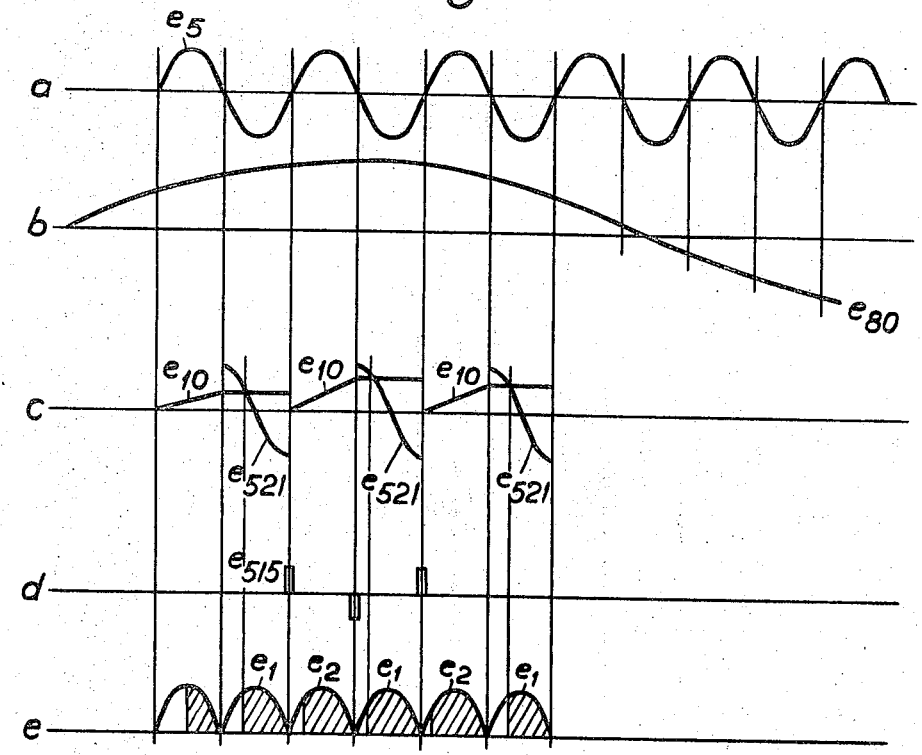
FIG. 4 shows voltage curves for a frequency converter according to FIG. 3.

In order to further describe the method of functioning of these transistors and the control means for the rectifiers 1 and 2 as a whole, reference should be made to FIG. 4 which shows voltage curves for different parts of the frequency converter and its control means. FIG. 4a shows the input voltage $e_5$ for the transformer windings 5, 51 and 52, whereas FIG. 4b shows the pilot voltage $e_{80}$ from the pilot voltage generator 80. The secondary windings belonging to the transformer winding 51 are now connected in such a way that during the first half period of the voltage $e_5$ according to the FIG. 4a, the transformer winding 511 delivers a control voltage to the transistor 101 so that the capacitor 10 is charged over a relatively low-ohmic resistor 104. During this half period, therefore, a voltage $e_{10}$ will arise over the capacitor 10, as indicated in FIG. 4c. When this half period is completed the transistor 101 will be blocked so that during the next half period the voltage $e_{10}$ will remain over the capacitor 10. During this half period the transformer winding 513 will deliver control voltage to the transistor 102 so that the voltage $e_{10}$ over a high ohmic resistor 105 and the transistor 102 is connected in series with the transformer winding 521 and the primary winding of the transformer 11. A voltage $e_{521}$ now appears over the transformer winding 521, which is shifted 90° in relation to the voltage $e_5$ in FIG. 4a. When the voltage curves $e_{10}$ and $e_{521}$ intersect each other the transformer 11 will be remagnetized and a voltage will be induced in its secondary winding, which voltage will function as control voltage for the rectifier 1 which will then become conducting. The transformer winding 515 is connected to the primary winding 51 in a sort of impulse connection, for example over an easily saturated part of the transformer core, so that when the half period just described has been completed a brief voltage impulse $e_{515}$ (see FIG. 4d) will be induced in this transformer winding so that the transistor 103 becomes conducting for an instant. The capacitor 10 will thus be short-circuited and is discharged over the transistor 103 so that the capacitor 10 has 0-voltage when it is afterwards connected over the transistor 101 to the pilot voltage generator 80 for re-charging. Since during the subsequent half period of the input voltage $e_5$ the pilot voltage $e_{80}$ is higher than during the previous charging period, the charging voltage $e_{10}$ during the subsequent half period of the input voltage will be somewhat higher than the time before and the process described is repeated for each period of the input voltage $e_5$. In the same way the capacitor 20 will be charged and deliver control voltage to the transformer 21 and then be recharged over the transistor 201, 202 and 203, respectively. The voltage over the output terminals 8, 9 of the frequency converter will therefore be composed of the sectioned parts $e_1$ and $e_2$ shown in FIG. 4e of the half periods of the input voltage $e_5$. When the pilot voltage $e_{80}$ then alters polarity the capacitors 10 and 20 will be charged with opposite polarity and connected to the transformers 11 and 21 by means of the above mentioned extra transistors, not shown, which means that the rectifier group 1, 2 will operate in inverter operation. At the same time the capacitors 30 and 40 will be charged to control the rectifiers 3 and 4 in FIG. 3 in rectifier operation and, by means of smoothing in the reactor 89, an output voltage is obtained over the output terminals 8, 9, which substantially corresponds to the pilot voltage $e_{80}$, but which is delayed in relation to this by one half period of the input voltage.

Figure 5:
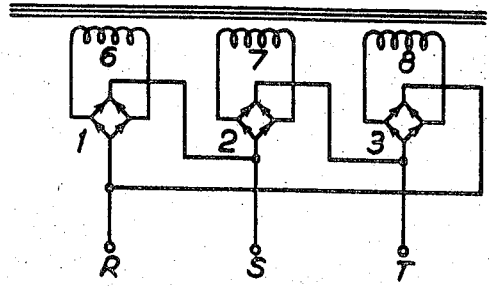

FIG. 5 shows a single phase-three phase frequency converter of known type which can suitably be controlled by a control means according to the invention. Such a converter comprises a converter transformer with a primary winding 5 connected to the input voltage and three secondary windings 6, 7 and 8 connected, each to its own rectifier bridge 1, 2 and 3, respectively. The rectifier bridges are connected in polygonal connection and the output voltage RST is taken out from the corners of this polygonal connection. Each rectifier bridge has the pulse number two and the four rectifiers in the bridge are controlled in pairs by a control means corresponding to a control means for one of the rectifier pairs 1, 2 or 3, 4 in FIG. 3. The pilot voltage generator 80 according to FIG. 3 must thus deliver a three phase pilot voltage to control each of the rectifier bridges in FIG. 5 so that each branch in the connection in FIG. 5 will correspond to a group 1, 2, 6 or 3, 4, 7 according to FIG. 3. In this way the previously mentioned condition will automatically be fulfilled so that subharmonics and eddy currents and DC excitations arising from them in the polygonally connected frequency converter are avoided.

Figure 6:
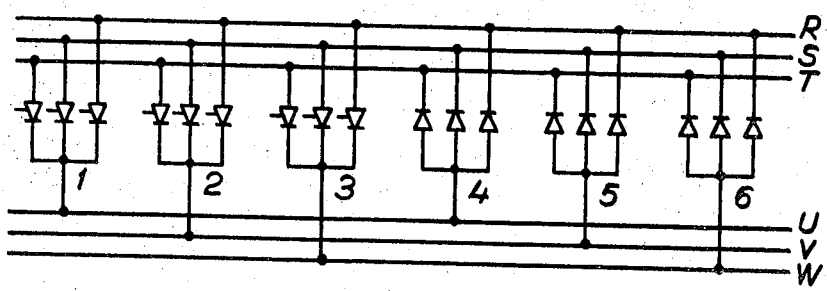
Figure 7:
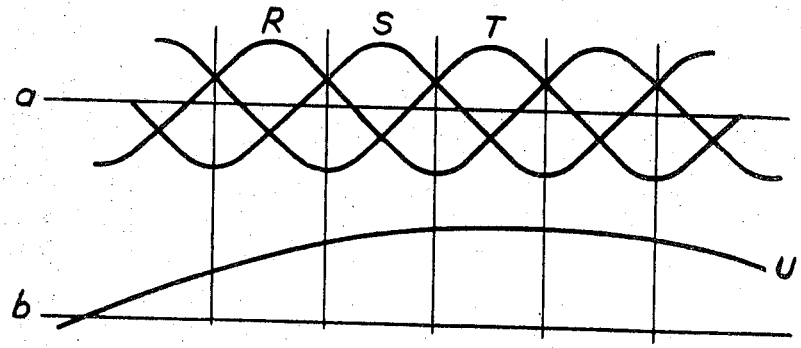
FIG. 7 shows the ratios between the input and output voltages of the converter according to FIG. 6.

FIG. 6 shows a known three phase-three phase frequency converter for direct conversion of an alternating voltage RST to an output alternating voltage UVW. Each secondary phase is connected to the primary network by means of two rectifier groups 1, 4, 2, 5 and 3, 6, respectively, and each rectifier group has the pulse number 3. For each rectifier group, therefore, there must be a control device corresponding to the control device for one rectifier pair, according to FIG. 3, containing three capacitors corresponding to the capacitors 10, 20 in FIG. 3 with their connecting members. FIG. 7a shows the voltage curves for the primary voltages RST whereas FIG. 7b shows one phase of a pilot voltage for a secondary voltage U. Since each rectifier group has the pulse number three, the appropriate control capacitors in the control device must integrate the pilot voltage U for one third of the period time of the primary network, that is, for an interval of 120°, as indicated in FIG. 7. During the first 120° interval of the primary voltage the pilot voltage U will be integrated by one capacitor and the charging voltage of this capacitor will then be used to control the corresponding rectifier during the next 120° period of the primary voltage. The curves for the control voltages and output voltages will thus exactly correspond to those shown in FIG. 4.

I claim:
1. Control means for a frequency converter for converting an alternating voltage having a higher frequency to an alternating voltage have a lower frequency, which converter comprises at least two groups of mutually commutating rectifiers and control means therefor including a control circuit, the control means for one group of rectifiers comprising a pilot voltage generator which, generates a pilot voltage, the amplitude and frequency of which corresponds to the desired amplitude and frequency of the output voltage of the converter, means to derive a reference voltage from the input voltage of the converter, means to compare the pilot voltage with the reference voltage means responsive to such comparison to give the desired control angle for the rectifiers in said group, the control means for each rectifier in a group containing an integrating means comprising a memory device and a switching means for connecting said memory device alternately to said pilot voltage generator and to a control circuit for said rectifier, which switching means is controlled by the input voltage of the converter at a rate corresponding to the period length of the input voltage divided by the pulse number of the commutating group, and including means operable during one half cycle of the input voltage to integrate the pilot voltage and during the subsequent half period of the input voltage to store the integrated value in the storage device, and means responsive to the stored integrated value to control the rectifier group during the next subsequent half period.

2. Control means according to claim 1, in which said integrating means with its memory device comprises a capacitor.

3. Control means according to claim 1 for a frequency converter comprising at least one commutation group of rectifiers with the pulse number two, fed from a single phase input voltage, in which during each half period of the input voltage the corresponding pilot voltage is integrated while during the subsequent half period of the input voltage this integration value is stored in said memory device to control the rectifier group during this subsequent half period.

4. Control means according to claim 1, in which said switching means comprises a discharging device which is connected briefly to discharge said memory device at the same time that the discharging device and the integrating member are switched over from said rectifier control circuit to said pilot voltage.

References Cited
UNITED STATES PATENTS

| | | | |
|---|---|---|---|
| 3,256,244 | 6/1966 | Byloff et al. | 321—69X |
| 3,319,147 | 5/1967 | Mapham | 321—6 |
| 3,332,002 | 7/1967 | Jollois | 321—69X |
| 3,400,321 | 9/1968 | Lafuze | 321—60 |

WILLIAM H. BEHA, JR., Primary Examiner

U.S. Cl. X.R.

321—69